R. R. Crowe,
Kitchen Table,
N°. 49,729. Patented Sep. 5, 1865.
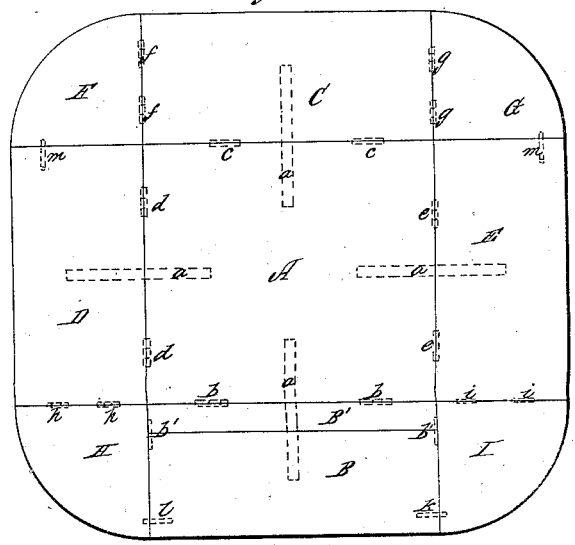
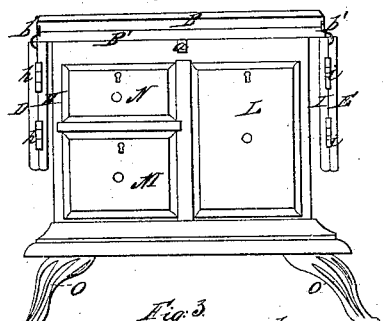
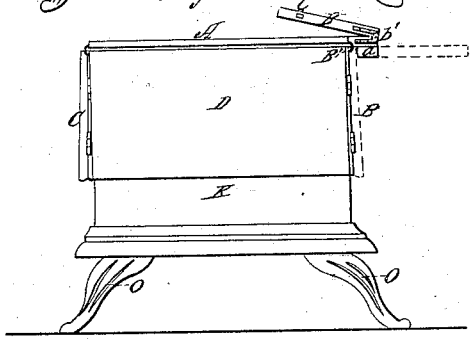
Witnesses:
Inventor:
Rich'd R. Crowe

UNITED STATES PATENT OFFICE.

RICHARD R. CROWE, OF CHICAGO, ILLINOIS.

IMPROVED TABLE.

Specification forming part of Letters Patent No. 49,729, dated September 5, 1865.

*To all whom it may concern:*

Be it known that I, RICHARD R. CROWE, of Chicago, in the county of Cook and State of Illinois, have invented a new and useful Improvement in Combined Cupboard and Table; and I do hereby declare that the following is a full, clear, and exact description of the same, reference being had to the accompanying drawings and the letters and figures marked thereon, which form part of this specification.

The nature of my said invention consists in so constructing and arranging a table upon and in combination with a cupboard or inclosure of drawers that the same may be folded down so as to occupy a very small space, and be readily moved from one room to another, if desired; or it may be unfolded or expanded so as to make a very large table; or by unfolding and properly adjusting certain sections or parts thereof a table of any desired form and dimensions is obtained; or it may be converted into a writing-desk.

To enable those skilled in the art to understand how to construct and use my invention, I will proceed to describe the same with particularity, making reference in so doing to the aforesaid drawings, in which—

Figure 1 represents a plan or top view of my invention; Fig. 2, a front elevation of the same, the leaves being folded down and arranged in form of a writing-desk, showing cabinet of drawers; and Fig. 3 is a side view thereof when arranged as shown in Fig. 2.

Similar letters of reference in the several figures denote corresponding parts of my invention.

A represents the top of the cabinet, R, serving also as the central part or piece of the table, B C D E representing four folding leaves attached to A, substantially as shown, by the hinges *b c d e* or their equivalents.

*a* represents four arms, which are drawn out to support said leaves when in use, and pushed in out of the way when the leaves are to be folded down.

The leaf B is constructed in two parts, B B', connected by the hinges marked *b'*, as shown, to enable the same to be folded, as shown in Figs. 2 and 3, to adapt the leaf for use as a writing-desk.

F G H I represent four auxiliary leaves to fill out the corners left by the leaves B C D E, the leaves F G being hinged to the leaf C at *f g*, and the leaves H I being hinged to D and E at *h* and *i*, as shown. When the leaves are all spread out, as shown in Fig. 1, the said auxiliary leaves are supported by means of the spring-catches or other equivalent devices, (marked *k l m n* respectively,) which are thrown out of the main leaves and enter corresponding slots in the auxiliary leaves. When the leaves are extended, as seen in Fig. 1, or the leaf B is folded, as seen in Figs. 2 and 3, the cabinet of drawers L M N is disclosed, in which the table-ware and cutlery may be kept when not in use, being securely locked and concealed by the leaf B when let down, as shown in the red lines in Fig. 3.

When only a small table is required the leaves B C or D E may be used alone, or the leaves D C F, or any corresponding set, may be used; and by arranging B B' as shown in Figs. 2 and 3 it serves as a writing-desk, the side of B which is uppermost when so arranged being covered with velvet or cloth, if so desired.

Having described my invention, I will specify what I claim and desire to secure by Letters Patent—

The combination and arrangement of the table-top A with the leaves B C D E and auxiliary leaves F G H I, operating as and for the purposes shown and set forth.

RICHD. R. CROWE.

Witnesses:
W. E. MARRS,
L. L. COBURN.